United States Patent [19]

Taniguchi et al.

[11] Patent Number: 5,051,974
[45] Date of Patent: Sep. 24, 1991

[54] OPTICAL HEAD DEVICE HAVING A LIGHT SPLITTER WITH A DIFFRACTION GRATING STRUCTURE

[75] Inventors: Naosato Taniguchi, Atsugi; Kiyonobu Endo; Tetsuro Kuwayama, both of Yokohama; Hiroaki Hoshi, Kawasaki; Hiroshi Osawa, Atsugi; Koyo Hasegawa, Tokyo; Masakuni Yamamoto, Atsugi, all of Japan

[73] Assignee: Canon Kabushiki Kaisha, Tokyo, Japan

[21] Appl. No.: 405,061

[22] Filed: Sep. 8, 1989

Related U.S. Application Data

[63] Continuation of Ser. No. 940,351, Dec. 11, 1986, abandoned.

[30] Foreign Application Priority Data

Dec. 16, 1985 [JP] Japan .............................. 60-282205

[51] Int. Cl.$^5$ .............................................. G11B 7/00
[52] U.S. Cl. .................................. 369/44.12; 369/112
[58] Field of Search ............... 369/46, 112, 120–122, 369/44.37, 44.11, 44.12; 350/162.2, 162.17, 162.21, 162.22, 162.23, 170, 171, 173

[56] References Cited

U.S. PATENT DOCUMENTS

| | | | |
|---|---|---|---|
| 3,985,443 | 10/1976 | Danielsoon et al. | 356/162 R |
| 3,992,574 | 11/1976 | Bouwhuis et al. | 369/46 |
| 4,358,200 | 11/1982 | Heemskerk et al. | 369/45 X |
| 4,544,269 | 10/1985 | Nose et al. | 350/162.17 X |
| 4,591,256 | 5/1986 | Matsumura | 350/162.23 |
| 4,718,052 | 1/1988 | Kondo et al. | 369/44.12 |
| 4,733,065 | 3/1988 | Hoshi et al. | 369/112 X |

FOREIGN PATENT DOCUMENTS

| | | | |
|---|---|---|---|
| 59-186149 | 10/1984 | Japan | 369/112 |
| 60-263350 | 12/1985 | Japan | 369/44.12 |
| 61-11947 | 1/1986 | Japan | 369/44.23 |

*Primary Examiner*—Donald McElheny, Jr.
*Attorney, Agent, or Firm*—Fitzpatrick, Cella, Harper & Scinto

[57] ABSTRACT

An optical head device comprises a light source, a light splitter for reflecting a light emitted from the light source by a first plane thereof to direct the light to an information carrier and transmitting the light from the information carrier through the first plane, a photo-detector for detecting the light from the information carrier, and a diffraction grating structure arranged on a second plane of the light splitter for diffracting the light transmitted through the first plane and directing it to the photo-detector.

11 Claims, 5 Drawing Sheets

OPTICAL HEAD DEVICE HAVING A LIGHT SPLITTER WITH A DIFFRACTION GRATING STRUCTURE

This application is a continuation of application Ser. No. 06/940,351, filed Dec. 11, 1986, now abandoned.

BACKGROUND OF THE INVENTION

The present invention relates to an optical head device for irradiating a light to an information recording carrier or medium to optically record or reproduce information.

A compact disk which records a digitized audio signal by roughness of a surface and a video disk which records a TV video signal have been rapidly populated.

In a compact disk player, not only a stationary type but also portable type or vehicle mount type are expected.

User's requirements to such optical information recording and reproducing apparatus are thin, compact and inexpensive. Same requirements are imposed to the optical head device which is mounted in such an information recording and reproducing apparatus and which records or reproduces information on or from the information carrier.

Figure 1:
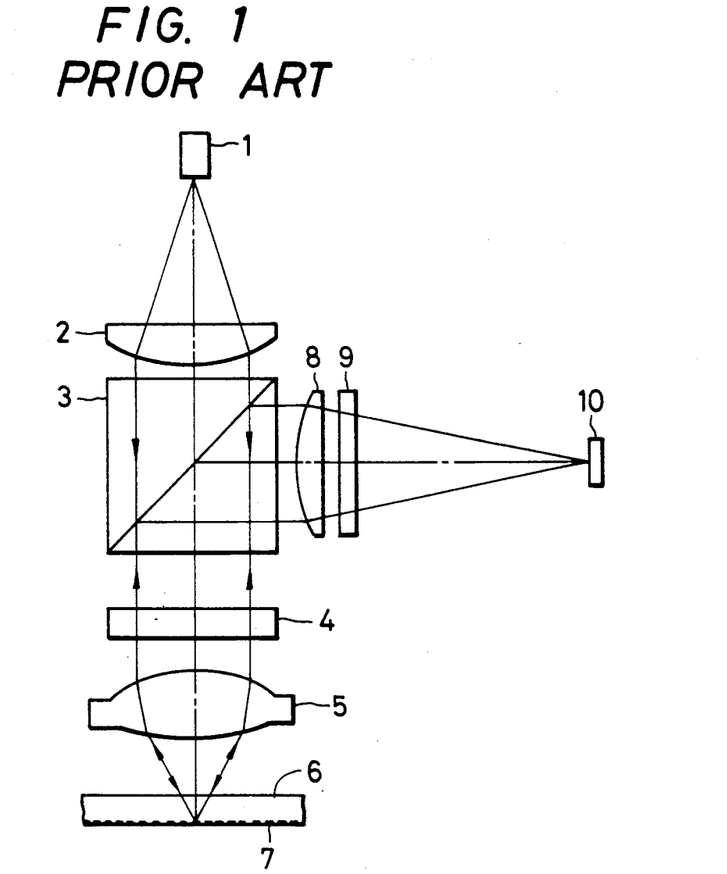
FIG. 1 shows a prior art optical head device.

FIG. 1 shows a prior art optical head device.

In FIG. 1, a dispersing light flux emitted from a laser light source 1 is directed to a collimator lens 2 where it is collimated and directed to a polarization beam splitter 3, which transmits substantially 100% of linear polarized light having a vibration plane in a specific direction and reflects substantially 100% of linear polarization light having a vibration plane orthogonal to said plane.

The linear polarization light transmitted through the polarization beam splitter 3 passes through a λ/4 plate and is converted to a circular polarization light, which is focused by an objective lens 5 onto an information recording plane 7 formed on a substrate 6 of the information carrier to form a spot of around 1 μm in diameter.

The light flux reflected by the information recording plane 7 passes through the objective lens 5 by which it is collimated, and it passes through the λ/4 plate 4 by which it is converted to a linear polarization light having a vibration plane orthogonal to that for an incident light thereto. The light is then directed to the polarization beam splitter 3. The polarization beam splitter 3 acts as a light splitter because of the property described above and reflects the light reflected from the information recording plane 7 to separate it from the incident light, and directs the reflected light to a photo-detector 10 as a focused light flux through a sensor lens 8 and a cylindrical lens 9.

When the information is to be recorded by using the optical head device, the laser light source 1 is driven in accordance with the information signal to modulate an intensity of an incident light to the information recording plane 7 to record the information. When the information is to be detected, a non-modulated light is irradiated to the information recording plane 7 having information recorded thereon by pits or changes of reflection coefficient and the reflected light modulated by the recorded information is detected by the photo-detector 10 so that the information is reproduced. The photo-detector 10 has a photo-sensing plane thereof divided into four sections, and a focus error signal is detected by a combination with a cylindrical lens 9 by a known method (so-called astigmatism method).

However, in the prior art optical head device, it is necessary to arrange many optical elements such as polarization beam splitter and photo-detector in a space in a predetermined relationship, and mutual positioning is complex.

Further, because of a large number of parts, it is difficult to reduce the size of the device and many manufacturing steps are required and hence the device is expensive.

It is an object of the present invention to provide an optical head device which resolves the problems encountered in the prior art device, is suitable for size reduction and weight reduction, and can be manufactured at a low cost.

The above object of the present invention is accomplished by the optical head device comprising a light source, a light splitter for reflecting a light emitted from the light source by a first plane to direct it to an information carrier and transmitting a light from the information carrier through the first plane, a photo-detector for detecting the light from the information carrier, and a diffraction grating structure for diffracting the light transmitted through the first plane to a second plane of the light splitter other than the first plane to direct the light to the photo-detector.

DETAILED DESCRIPTION OF THE PREFERRED EMBODIMENTS

Figure 2A:
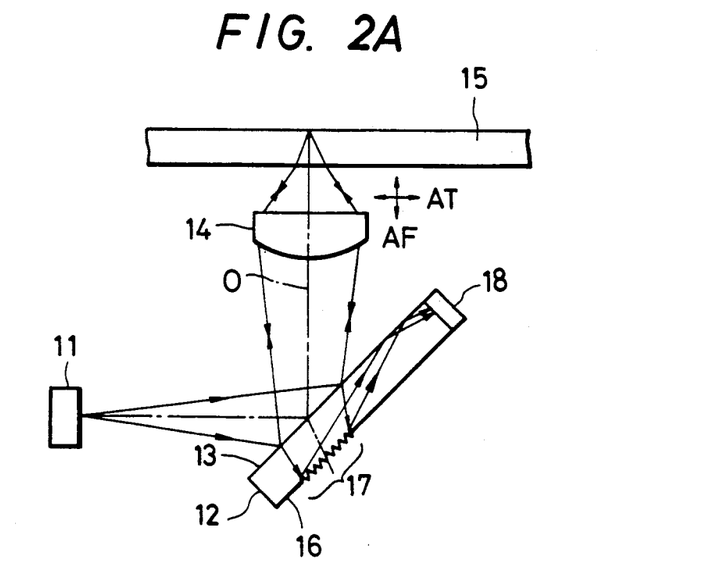
FIG. 2A shows a first embodiment of an optical head device of the present invention.
Figure 2B:
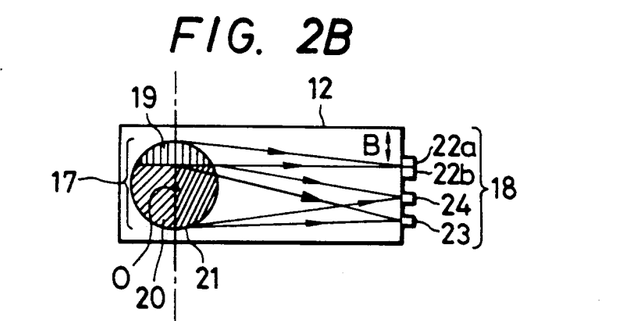
FIG. 2B shows a plan view of a light splitter in the first embodiment.

FIG. 2A shows a first embodiment of the optical head device of the present invention, and FIG. 2B shows a plan view of a light splitter 12.

In FIG. 2A, at least a portion of a light flux emitted from a light source 11 such as a semiconductor laser is reflected by a first plane 13 of a plate-like light splitter 12, and the reflected light flux is focused into a fine spot on an information recording plane of an information carrier 15 by an objective lens 14. The reflected light from the information carrier 15 again passes through the objective lens 14 and at least a portion thereof passes through the first plane 13 of the light splitter 12 and is reflected and diffracted by a diffraction grating structure 17 arranged on a second plane 16 which is substantially parallel to the first plane 13, and the diffracted light is totally reflected between the first plane 13 and the second plane 16 and directed to a photo-detector 18 arranged on an end plane cf the light splitter 12. The diffraction grating structure 17 arranged on the first plane 13 and the second plane 16 of the light splitter may have reflection films thereon as required so that desired reflection coefficients or diffraction efficiencies are obtained, or the glass material surfaces may be exposed and an angle to the light flux may be set to attain the above function by known optical technique.

As shown in FIG. 2B, the diffraction grating structure 17 is divided into three areas 19, 20 and 21 which have different directions of diffraction grating structures from each other. As a result, the lights diffracted in those areas are directed to divided photo-sensor areas 22a, 22b, 23 and 24 of the photo-detector 18. When a distance between the objective lens 14 and the information carrier 15 changes, an angle of incidence and a radius of incidence of the light flux applied to the light splitter 12 from the information carrier 15 change as is well known. The light diffracted by the area 19 deviated from an optical axis 0 of the objective lens 14 is swung in a direction B in accordance with the above change. Accordingly, a focus error signal is obtained by differentiating the detection signals of the photo-sensor areas 22a and 22b.

On the other hand, a division line between the areas 20 and 21 of the diffraction grating structure 17 is parallel to the information track on the information carrier 15, and the photo-sensor areas 23 and 24 photo-sense light intensity distributions in the divided far-field patterns of the information track. The detection signals are differentiated to produce a tracking error signal by a push-pull method. The information on the information track may be reproduced by a sum signal of all or a portion of the photo-sensor areas 22a, 22b, 23 and 24.

The focus error signal and the tracking error signal are fed back to a lens drive mechanism (lens actuator) not shown in FIG. 2A to drive the objective lens 14 along the optical axis and the direction normal to the optical axis in order to effect focusing and tracking. The optical head device of FIG. 2A uses the thin light splitter 12 which may be integrally bonded to the photo-detector 18. Accordingly, the device can be compact and light in weight and uses a small number of optical elements. Thus, the adjustment of the optical system is easy, the reliability is high and the manufacturing cost is low.

A method for manufacturing the light splitter of the present invention is explained.

Figure 3A:
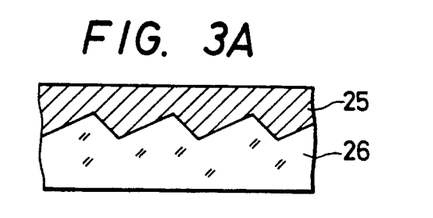
FIGS. 3A to 3C show sectional views for illustrating manufacturing process of the light splitter of the optical head device of the present invention.
Figure 3B:
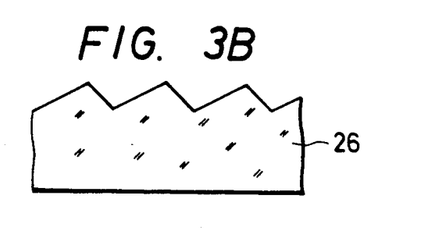
Figure 3C:
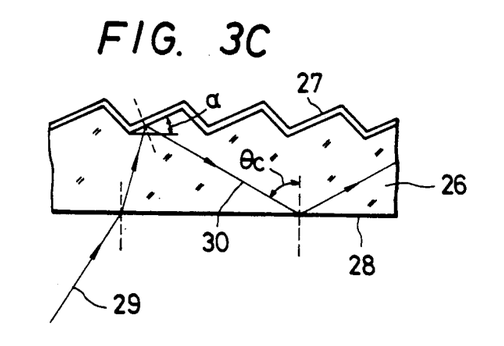

FIGS. 3A-3C show sectional views for illustrating manufacturing steps of the light splitter. A material such as phosphor bronze is cut by a diamond cutter to form a plurality of element gratings corresponding to the areas of the diffraction grating structure 17. Those element gratings are combined and contained in a holding case to form a molding 25. In order to make plural moldings at a time, a plurality of element gratings of each kind may be formed at a time by dividing the cut integral gratings of each kind. As shown in FIG. 3A, the molding 25 is pushed to mold material such as acryl resin, polycarbonate or glass to transfer the molding so that the light splitter 26 having the diffraction grating structure shown in FIG. 3B is formed. As shown in FIG. 3C, a reflection film 27 is formed by vapor deposition or sputtering on the diffraction grating structure as required in order to improve a reflection coefficient or a diffraction efficiency. In FIG. 3C, a grating angle $\alpha$ of the diffraction grating structure formed on the second plane of the light splitter 26 is preferably set such that the light flux 29 applied to the first plane 28 is reflected and diffracted and the diffracted light 30 is totally reflected by the first plane 28 (angle $\theta c$ of incidence to the first plane 28) and directed to the photo-detector with a low light intensity loss.

Figure 4A:
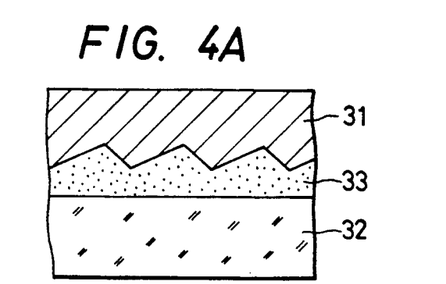
FIGS. 4A to 4C show sectional views for illustrating another manufacturing process of the light splitter.
Figure 4B:
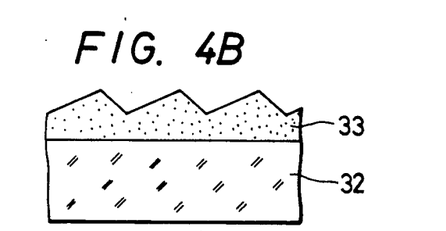
Figure 4C:
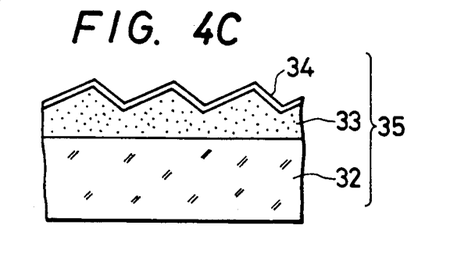

FIGS. 4A to 4C show sectional views of another process of the manufacturing method of the light splitter. As shown in FIG. 4A, resin 33 (epoxy resin, photopolymer resin, etc.) is flown into a clearance between a molding 31 having a grating formed thereon like the molding 25 shown in FIG. 3A and molding material 32, and the resin is cured by an energy such as heat or light. When the molding 31 is removed, a diffraction grating structure shown in FIG. 4B is formed. As shown in FIG. 4C, a reflection film 34 is formed on the diffraction grating structure as required to form the light splitter 35.

In the above manufacturing method, when the grating formed in the molding is of simple linear shape or of cone shape as shown in an embodiment to be described later, it can be readily machined by a ruling engine or a precision engine lathe. When a complex grating shape such as ellipse, parabola or hyperbola is required, a resist grating is formed by hologram exposure or electron beam drawing and a blazed grating may be formed by an ion beam etching process. The grating may also be formed by an NC machine or any other known method.

FIGS. 5 to 9 show other embodiments of the optical head device of the present invention. The like elements to those shown in FIGS. 2A and 2B are designated by the like numerals and explanation thereof is omitted.

Figure 5:
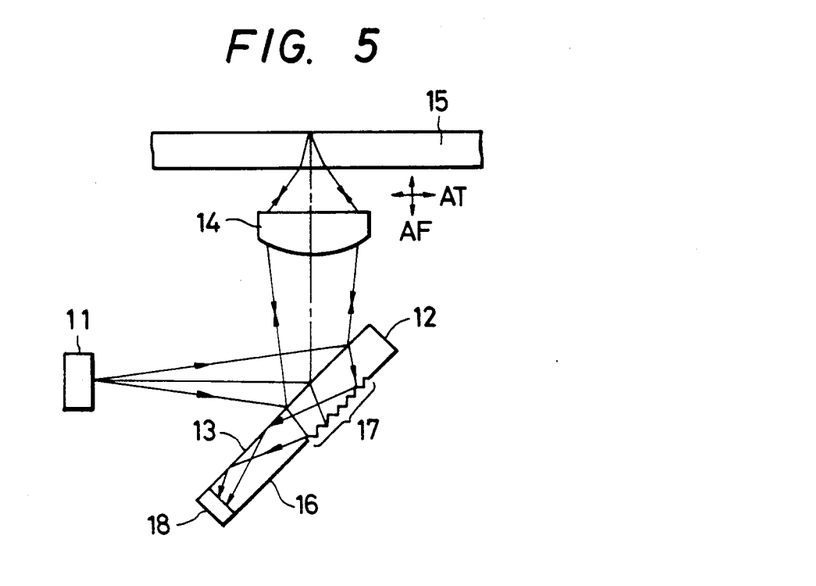
FIG. 5 shows a second embodiment of the optical head device.

In FIG. 5, the photo-detector 18 arranged on the side of the objective lens 14 in FIG. 2A is arranged on the side of the light source. Thus, the grating angle of the diffraction grating structure 17, that is, the angle of the first plane 13 to the light flux is set such that the light flux is directed in a manner shown in FIG. 5. In the present embodiment, the photo-detector 18 is hardly influenced by the electromagnetic noise generated by the actuator for driving the objective lens 14.

Figure 6A:
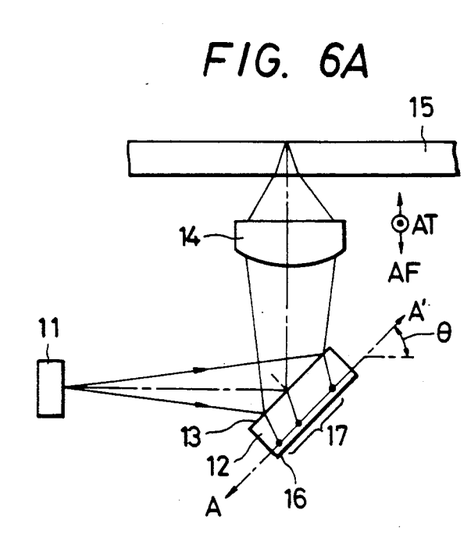
FIG. 6A shows a third embodiment of the optical head device.
Figure 6B:
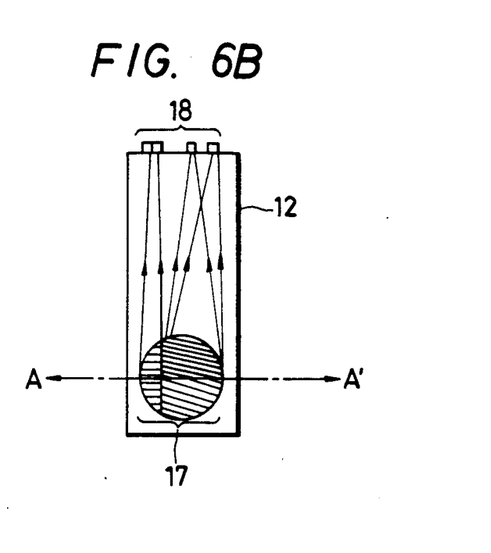
FIG. 6B shows a plan view of a light splitter in the third embodiment.

In FIGS. 6A and 6B, the dividing line AA' of the diffraction grating structure 17 of the light splitter 12 is inclined by $\theta$ relative to the plane of the information carrier 15. In the present embodiment, since the direction of propagation of the light in the light splitter is substantially parallel to the plane of the information carrier 15, the optical pickup can be thinner than that of FIG. 2A.

In the above embodiments, a so-called definite focusing system is used. In this system, a plane vibration of the information carrier 15 is large. Thus, when the objective lens must track with a long stroke, a focusing magnification varies and the spot diameter on the record carrier varies. An approach to resolve this problem is shown below.

Figure 7:
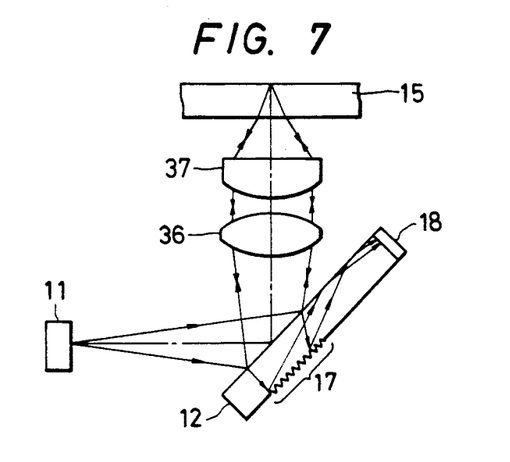
FIG. 7 shows a fourth embodiment of the optical head device.

In FIG. 7, a collimator lens 36 is arranged between the light splitter 12 and the objective lens 37. Since the light impinging to the objective lens 37 from the light splitter 12 is collimated, the above problem does not arise.

Figure 8A:
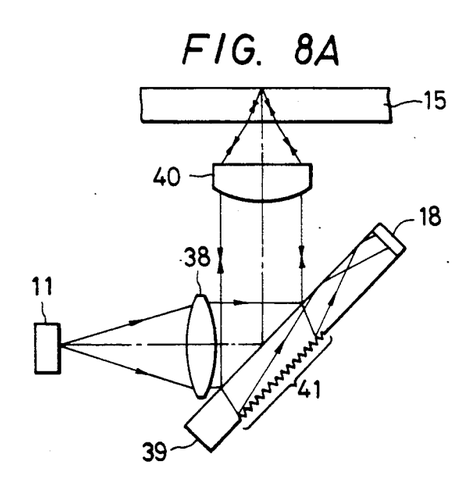
FIG. 8A shows a fifth embodiment of the optical head device.
Figure 8B:
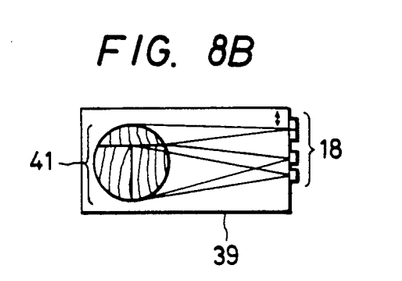
FIG. 8B shows a plan view of a light splitter in the fifth embodiment.

In FIGS. 8A and 8B, a collimator lens 38 is arranged between the light source 11 and the light splitter 39. The light flux reflected by the light splitter 39 is focused by the focusing lens 40 onto the information carrier 15. In the present embodiment, since the reflected light from the information carrier 15 is directed to the light splitter 39 as a collimated light, the grating of the diffraction grating structure preferably has a curvature as shown in FIG. 8B and the light flux is focused by the curved grating and directed to the photo-detector 18.

Figure 9:
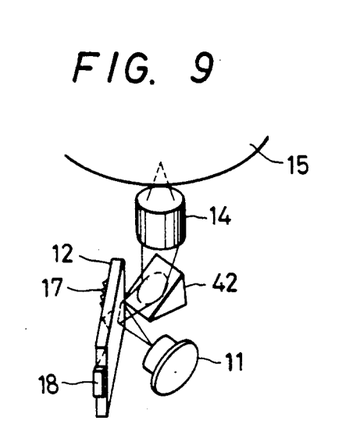
FIG. 9 shows a perspective view of a sixth embodiment of the optical head device.

In FIG. 9, a light path deflection mirror 42 is arranged between the light splitter 12 and the objective lens 14 and the longitudinal direction of the light splitter 12 is arranged substantially parallel to the plane of the information carrier 15. In this embodiment, an effective area of the reflection area of the light path deflection mirror 42 need be only slightly larger than the spread of the light flux. Accordingly, the optical head device can be very thin.

The present invention is not limited to the above embodiments but various modifications thereof may be made. For example, the direction of the diffraction light may be any direction in accordance with the design of the focus error and tracking error detection systems.

The second plane on which the diffraction grating structure is arranged may not necessarily be parallel to the first plane but it may be an inclined plane, or concave or convex plane.

In the above embodiments, the optical medium in the light path in the light splitter leading to the photo-detector 18 has a single index of refraction. In an implementation, transparent plastic such as acryl or epoxy, or air layer may be arranged in the light path leading to the photo-detector.

As described above, in accordance with the present invention, the light splitter of the optical head device is provided with the diffraction grating structure. Thus, the size and weight of the device are reduced, the number of optical elements is reduced, the optical adjustment is facilitated and the manufacturing cost is reduced.

What we claim is:

1. An optical head device comprising:
   a light source;
   a photo-detector for detecting light from an information recording medium;
   an objective optical system for focusing the light onto the information recording medium; and
   a plate-like splitter diagonally arranged in a light path from said light source to said objective optical system, said light splitter having a first plane for reflecting at least a portion of the light emitted from said light source to direct the reflected light to said objective optical system and transmitting at least a portion of the light from the information recording medium, and a second plane having a diffraction grating structure mounted thereon,
   said diffraction grating structure diffracting light transmitted through said first plane to direct the diffracted light to said photo-detector,
   said diffraction grating structure being formed in such a manner that each of a light path to said splitter from said light source, a light path to said objective optical system from said splitter and a light path to said photo-detector from said splitter are perpendicular to the other two light paths.

2. An optical head device according to claim 1 wherein said diffraction grating structure has a plurality of grating areas of different diffraction directions from each other.

3. An optical head device according to claim 1 wherein said diffraction grating structure is integrally formed with said second plane.

4. An optical head device according to claim 1 wherein said diffraction grating structure has a reflection film formed thereon.

5. An optical head device according to claim 1 wherein said photo-detector is integrally mounted on said light splitter.

6. An optical head device according to claim 5 wherein the material of said light splitter arranged in a light path from said diffraction grating structure to said photo-detector has a single index of refraction.

7. An optical head device according to claim 1 wherein a collimator optical system for collimating the reflected light from said first plane and directing the collimated light to said objective optical system is arranged between said first plane and said objective optical system.

8. An optical head device according to claim 1 wherein a collimator optical system for collimating the light from said light source and directing the collimated light to said first plane is arranged between said light source and said first plane.

9. An optical head device according to claim 8, wherein the grating of said diffraction grating structure is curved so as to condense the diffracted light.

10. An optical head device according to claim 1 wherein said first plane and said second plane are substantially parallel.

11. An optical head device according to claim 1, wherein the first and second plane totally reflect the light diffracted by said diffraction grating structure to direct the reflected light to said photo-detector through said light splitter.

* * * * *

UNITED STATES PATENT AND TRADEMARK OFFICE
CERTIFICATE OF CORRECTION

PATENT NO. : 5,051,974

DATED : September 24, 1991

INVENTOR(S) : NAOSATO TANIGUCHI, ET AL.

It is certified that error appears in the above-identified patent and that said Letters Patent is hereby corrected as shown below:

On the title page : Item

[56]

At U.S. PATENT DOCUMENTS

"Danielsoon et al." should read -- Danielsson et al. --.

-- 4,595,290  6/1986  Nose et al ...........350/162.2 XR--. should be added.

-- 4,436,398  3/1984  Endo et al............350/162.23 -- should be added.

At FOREIGN PATENT DOCUMENTS

-- 60-28044  2/1985  Japan...........369/112 -- should be added.

COLUMN 1

Line 16, "populated." should read -- popularize. --.

COLUMN 2

Line 13, "resolves" should read -- solves --.

UNITED STATES PATENT AND TRADEMARK OFFICE
CERTIFICATE OF CORRECTION

PATENT NO. : 5,051,974
DATED : September 24, 1991
INVENTOR(S) : NAOSATO TANIGUCHI, ET AL.

It is certified that error appears in the above-identified patent and that said Letters Patent is hereby corrected as shown below:

COLUMN 3

Line 4, "between," should read -- between --.
       Line 53, Line 8 "is explained." should read -- is now explained. --.

COLUMN 4

Line 60, "resolve" should read -- solve --.

COLUMN 6

Line 48, "plane" should read --planes--.

Signed and Sealed this

Twentieth Day of April, 1993

Attest:

MICHAEL K. KIRK

*Attesting Officer*      *Acting Commissioner of Patents and Trademarks*